(12) United States Patent
Appa

(10) Patent No.: US 9,537,371 B2
(45) Date of Patent: Jan. 3, 2017

(54) CONTRA ROTOR WIND TURBINE SYSTEM USING A HYDRAULIC POWER TRANSMISSION DEVICE

(71) Applicant: Kari Appa, Irvine, CA (US)

(72) Inventor: Kari Appa, Irvine, CA (US)

(*) Notice: Subject to any disclaimer, the term of this patent is extended or adjusted under 35 U.S.C. 154(b) by 67 days.

(21) Appl. No.: 14/565,450

(22) Filed: Dec. 10, 2014

(65) Prior Publication Data

US 2016/0172934 A1 Jun. 16, 2016

Related U.S. Application Data

(60) Provisional application No. 61/997,734, filed on Jun. 9, 2014.

(51) Int. Cl.
| | | |
|---|---|---|
| *H02K 7/18* | (2006.01) | |
| *F03D 1/02* | (2006.01) | |
| *F03D 11/02* | (2006.01) | |
| *F03D 9/00* | (2016.01) | |

(52) U.S. Cl.
CPC ............ *H02K 7/183* (2013.01); *F03D 1/025* (2013.01); *F03D 9/001* (2013.01); *F03D 11/02* (2013.01); *F03D 15/00* (2016.05); *F05D 2260/406* (2013.01); *Y02E 10/725* (2013.01)

(58) Field of Classification Search
CPC .......... F03D 1/025; F03D 9/002; F03D 11/02; F03D 9/001; F03D 15/00; Y02E 10/725; H02K 7/183; F05D 2260/406
See application file for complete search history.

(56) References Cited

U.S. PATENT DOCUMENTS

| | | | | |
|---|---|---|---|---|
| 6,127,739 A | * | 10/2000 | Appa | ........................ F01D 1/26 |
| | | | | 290/42 |
| 6,278,197 B1 | * | 8/2001 | Appa | ...................... F03D 1/025 |
| | | | | 290/54 |
| 6,492,743 B1 | * | 12/2002 | Appa | ........................ F01D 1/32 |
| | | | | 290/44 |
| 7,679,249 B2 | | 3/2010 | Appa | |
| 7,789,624 B2 | | 9/2010 | Appa | |

(Continued)

OTHER PUBLICATIONS

Appa Kari , 2002 Energy Innovations Small Grant (EISG) Program (Counter rotating wind turbine system) Technical Report, California, US. 00-09 FAR Appendix A.

(Continued)

*Primary Examiner* — Michael Zarroli
(74) *Attorney, Agent, or Firm* — Kari Appa

(57) ABSTRACT

The present invention provides a system for a contra rotor wind turbine system comprising of dual aerodynamic rotors composed of plurality of either radially extended blades or axially extended helically contoured blades. The blades on the upwind or the outer rotor are set to spin in the first direction about the outer shaft, while the blades on the downwind or inner rotor are set to spin in a second direction about the co-axially mounted center shaft. Each rotor drives a digitally controllable positive displacement pump unit to convert the kinetic energy of the rotor to the fluidic potential energy. The potential energy of each rotor is compounded to achieve net potential energy. The net potential energy is stored in a fluidic reservoir and used by a hydraulic motor to drive an electrical generator. The hydraulic pump and the motor units are provided to maintain uniform rotational speed and torque.

11 Claims, 12 Drawing Sheets

(56) References Cited

U.S. PATENT DOCUMENTS

| | | | | |
|---|---|---|---|---|
| 8,875,511 | B2* | 11/2014 | Simpson | F24J 3/08 |
| | | | | 290/44 |
| 8,938,967 | B2* | 1/2015 | McMaster | F03D 9/02 |
| | | | | 290/44 |
| 2004/0096327 | A1* | 5/2004 | Appa | F03D 1/025 |
| | | | | 416/1 |
| 2013/0277971 | A1* | 10/2013 | Cho | F03D 9/002 |
| | | | | 290/44 |
| 2015/0159628 | A1* | 6/2015 | Appa | F03D 3/02 |
| | | | | 290/55 |
| 2016/0076519 | A1* | 3/2016 | Blake | F03D 1/025 |
| | | | | 205/628 |

OTHER PUBLICATIONS

Analysis of Counter-Rotating Wind Turbines, The Science of Making Torque from Wind IOP Publishing , Journal of Physics: Conference Series 75 (2007) 012003 doi:10.1088/1742-.

ChapDrive, Hydraulic Transmission for Wind Turbine , VP Asmund Furuseth, Production Technique Conference 2012, Mar. 7, 2012.

Hydrostatic Transmission for Wind Power, Brad Bohlmann Sustainability Director CCEFP Adjunct Professor, Mechanical Engineering, University of Minnesota.

Rahul Dutta, Modeling and Analysis of Short Term Energy Storage for Mid-Size Hydrostatic Wind Turbine, a Graduate School Thesis, University of Minnesota, Aug. 2012.

* cited by examiner

CONTRA ROTOR WIND TURBINE SYSTEM USING A HYDRAULIC POWER TRANSMISSION DEVICE

FIELD OF INVENTION

The present invention relates generally to turbines and specifically to an energy efficient contra rotor turbine that harnesses energy from a kinetic fluid flow medium to produce mechanical and electrical power thereof.

BACKGROUND OF THE INVENTION

The embodiments stated herein, generally relate to the field of electric power generation from the kinetic energy of a fluid flow medium, such as wind, steam or hydraulic fluid. More specifically, the embodiments described herein relate to the development of an energy efficient wind turbine (WT) system, having a pair of contra rotors (CR) coupled to an electrical power generating alternator by means of a hydraulic power transmission (HPT) device. According to the present innovation, the integration of the contra rotor wind turbine technology with the hydraulic power transmission device (CR-WT-HPT) results in a cost effective and an energy efficient wind turbine having the following features:
  reduced tower-top weight, since the low speed hydraulic pump unit need be mounted on the tower top, while the alternator could be placed on the ground level,
  the rotors could start easily and safely at any wind speed, because, the heavy duty alternator inertia load is not directly connected to the rotors and moreover, the torque required to drive the hydraulic pump units can be digitally controlled to match the rotor torque at any wind speed,
  increased annual energy yield per unit of rotor swept area,
  Significantly reduced noise level.

Said Contra Rotor Wind Turbine unit may comprise of conventional radially extended blades (FIG. 1a) having its axis of rotation in the direction of fluid flow, designated as CR-WT. Alternatively, each co-axial contra rotor unit may comprise of helically contoured blades having its axis of rotation, also positioned horizontally in the direction of fluid flow (FIG. 4) and designated as CR-HAWT. Still further, it may have an alternate configuration, wherein the axis of rotation of the helical bladed contra rotor may be positioned vertically up perpendicular to the flow field, designated as CR-VAWT.

As the need for energy continues to grow worldwide, the commitment to extract more of energy from the renewable sources increases. At present, the worldwide requirement is around 30 percent or more from solar and wind energy sources. For this reason, the offshore wind farm development is gaining popularity. According to the present technology, the cost of initial investment required on offshore wind turbine installations is nearly 3 to 4 times more expensive than that for the land based units. To minimize this cost, innovators are looking into several other technologies, which are more efficient and less expensive; such as:
a) The Contra Rotor Wind Turbine (CRWT, FIG. 1a), which is designed to yield nearly 30 to 50 percent more of annual energy per unit of rotor swept area, and
b) The Hydraulic Power Transmission (HPT, FIG. 1c) device that couples a rotor and an alternator. This HPT device permits the coupling of multiple rotors to a single alternator, which can be placed on the ground floor for easy access to installation and maintenance at minimal cost.

FIG. 2 shows the typical art of the present innovation, wherein the Contra Rotor (CR) technology and the hydraulic power transmission (HPT) technology are integrated to yield, a cost effective and an energy efficient wind turbine system.

SUMMARY

In view of the foregoing, an embodiment herein provides a contra rotor wind turbine system using a hydraulic power transmission device. The contra rotor wind turbine (CRWT) unit, depicted in FIG. 1a and described in Ref. 1, Ref. 2, and U.S. Pat. Nos. 6,127,739; 6,278,197 B1; 6,375,127; 7,679,249; 7,789,624, comprises of two rotors, set to spin in opposite direction to each other. The upwind rotor, while spinning in one direction generates aerodynamic torque and also imparts some kinetic energy to the vortex flow shed behind the upwind rotor. This kinetic energy contained in the vortex flow is utilized to turn the downwind rotor in opposite direction to the upwind rotor, so as to extract additional energy from the flow field swept behind the upwind rotor. Since, a certain amount of kinetic fluid energy is extracted by the downwind rotor, the downwind flow field will be rendered smooth, noise free and non-oscillatory and permits closer tower spacing than that required in the case of single rotor towers. For example the tower spacing in the case of the CRWT units may be as close as 4 times the rotor diameter versus 7 times for the conventional single rotor units. Thus, more of annual energy can be extracted in a given wind farm site.

According to an embodiment, the annual energy yield by the CRWT unit is seen to be 30 to 60 percent more than that of a conventional single rotor system of similar rotor swept area, according to our field tests reported in Ref. 1 and the CFD simulation study conducted at the Denmark Technical University (DTU) (Ref. 2). Furthermore, it has been observed, that the slower the rotor speed, higher is the percent of energy extraction (FIG. 1b). This is due to reduced blanketing effect on the downwind rotor. Hence, the CRWT technology is more applicable to the utility scale turbines, whose rotor speeds are less than 20 rpm or so.

At present, the contra rotor wind turbine technology uses direct coupling of the aerodynamic rotor assemblies with the alternator units. Hence, the entire power generating alternator unit need be assembled on the tower top. In the case of multi-megawatt (>10 MW) units, the tower-top weight could be as heavy as 500 tons or more. This leads to very expensive installation and maintenance cost. To overcome this problem, innovators (References 3 to 7) have developed an economical hydraulic power transmission (HPT) device (FIG. 1c), to couple the rotors and the alternator, that could be mounted at the tower base.

Now, it is the object of this innovation to develop a method of integrating the contra rotor (CR) technology with the hydraulic power transmission (HPT) technology to drive an alternator which can be mounted on ground level for the convenience of offshore wind turbine installation and maintenance. Thus, an efficient and cost effective utility scale contra rotor wind turbine is developed for installation in either the land based or the offshore based wind farms. Furthermore, the integration concept put forth here becomes applicable for all types of wind turbines, whether it is a vertical axis or a horizontal axis model, and whether having radial bladed rotor or helical bladed rotor. The method of compounding the potential energies of the helical bladed rotors, described in FIG. 4 and FIG. 5 is similar, even in the case of vertical axis rotors, wherein the kinetic energy of each rotor is transformed into fluidic potential energy and compounded to achieve the net effect in a stepwise manner.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The detailed description is set forth with reference to the accompanying figures. In the figures the use of the same reference numbers in different figures indicates similar or identical items.

DETAILED DESCRIPTION OF THE PREFERRED EMBODIMENTS

Figure 1A:
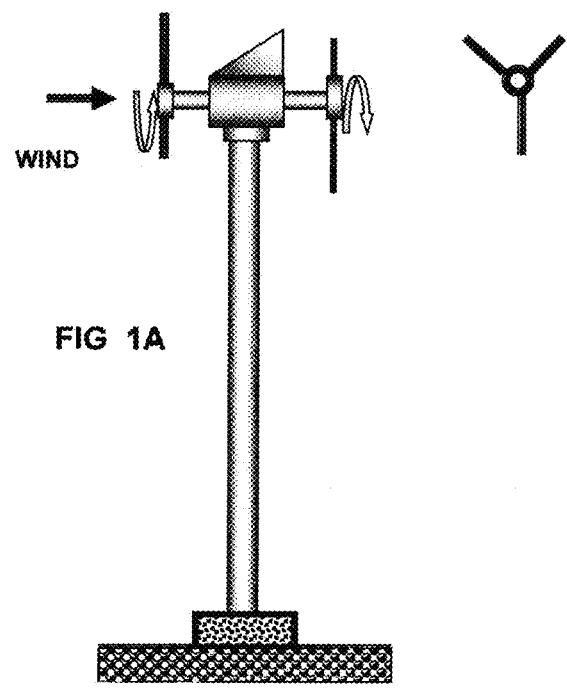
FIG. 1a presents a typical assembly of a contra rotor wind turbine of a prior art (U.S. Pat. No. 6,127,739, Ref. 1). The contra rotor wind turbine comprises of a dual rotor assembly, having a direct drive coupling device with an electricity generating alternator, according to an embodiment therein.
Figure 1B:
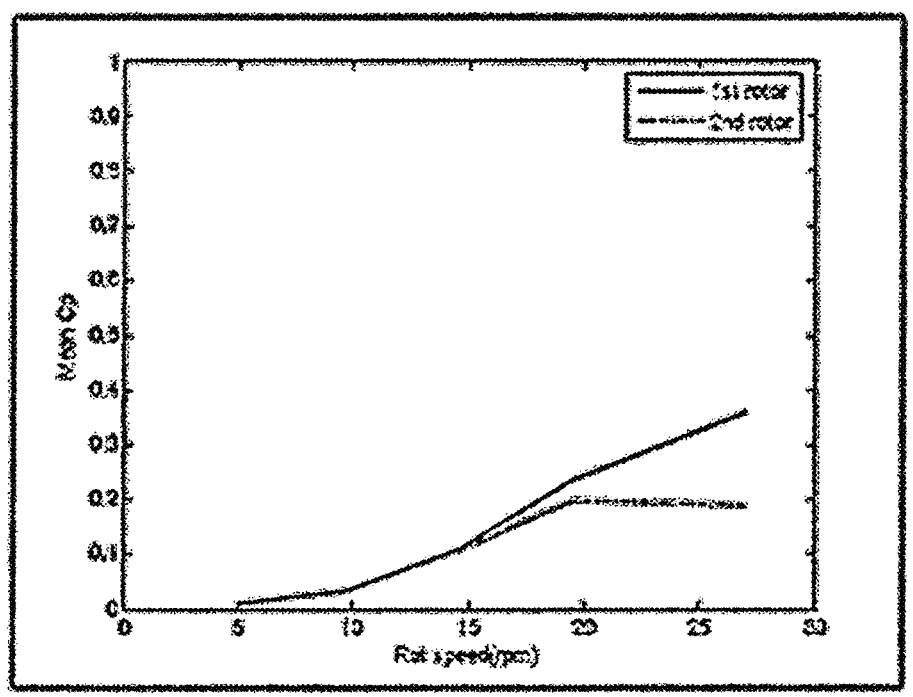
FIG. 1b shows the Cp performance characteristics of the upwind rotor and the downwind rotor in low rotor speed situations, according to an embodiment therein.
Figure 1C:
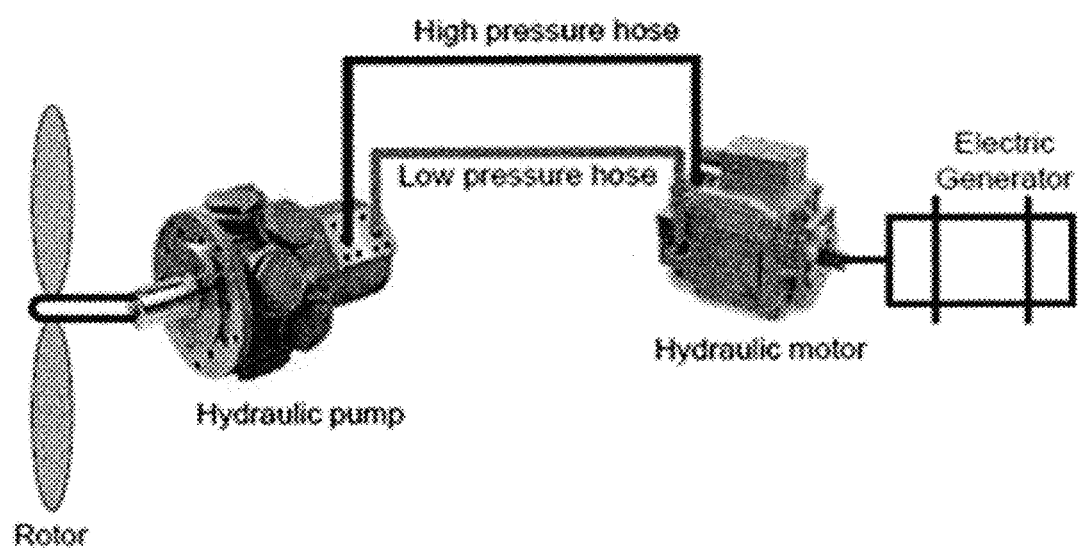
FIG. 1c presents a typical assembly of another prior art wind turbine technology, (described in Refs. 3 to 7) comprising of a rotor assembly, a low speed hydraulic pump unit, a high speed digital displacement hydraulic motor and an electricity generating alternator, according to an embodiment therein.

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there remains a need for a contra rotor wind turbine system using a hydraulic power transmission device. Referring now to drawings, and more particularly to FIGS. 1 through 7, where similar reference characters denote corresponding features consistently throughout the figures, there are shown preferred embodiments.

According to an embodiment, the detailed description of the integration of the contra rotor wind turbine concept with a hydraulic power transmission device is first presented with respect to the conventional radial bladed wind turbine (CRWT). In addition, an alternate wind turbine configuration comprising of axial flow helical bladed rotors is presented.

Contra Rotor Wind Turbine with Hydraulic Power Transmission Device

Here we consider two configurations of the contra rotors, namely the radial bladed rotor and the axial flow helical bladed rotor.

Case A: Radial Bladed Contra Rotor Wind Turbine

Figure 2:
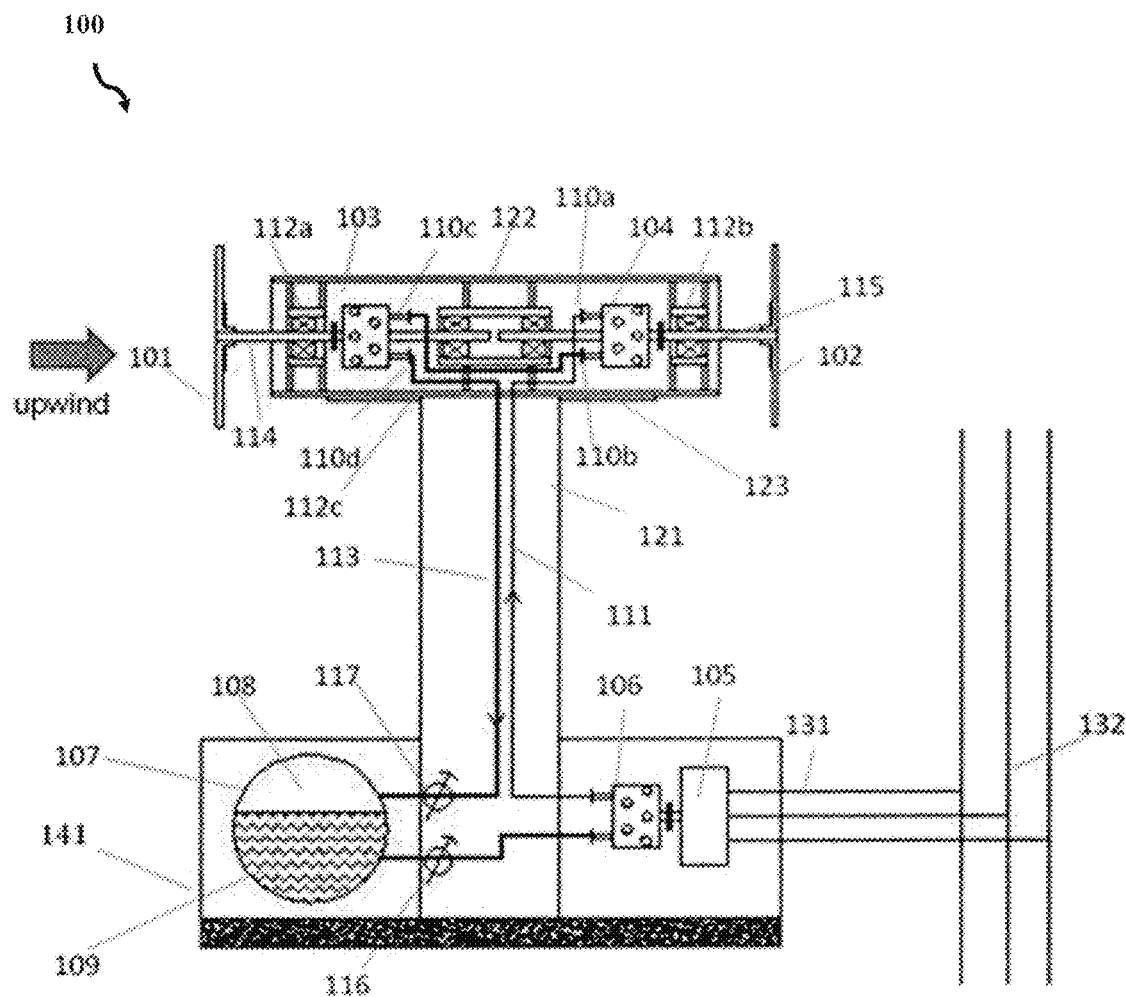
FIG. 2 illustrates a sectional view of an exemplary embodiment of the present innovation of a typical utility scale contra rotor wind turbine comprising of two radial bladed rotors set to spin in opposite direction to each other. Each rotor shaft is coupled to drive a digitally controlled positive displacement pump, such that the kinetic energy of the rotor is transformed into fluidic potential energy, according to an embodiment herein.

According to an embodiment, depicted in FIG. 2, a horizontal axis contra rotor wind turbine system 100 is provided, wherein the system comprises of a pair of aerodynamic torque producing rotors such as an upwind rotor 101 and a downwind rotor 102, wherein each rotor having plurality of radially extended blades. Said upwind rotor is fixed to the upwind rotor shaft 114 and its blades 101 are set to spin the rotor in a first direction. Likewise, said downwind rotor is fixed to the downwind rotor shaft 115 and its blades are set to spin the rotor in a second direction, opposite to the first direction. Furthermore, each rotor shaft is coupled to plurality of low speed digital displacement hydraulic pump units 103, 104, such that the kinetic energy of each rotor is transformed into potential energy in a compounded manner.

According to an embodiment, said upwind rotor and said downwind rotor shafts are supported on bearing units 112a, 112b, 112c, which are in turn supported on bulkheads of the cylindrical shell 122. The plurality of piston units are connected in series such that the kinetic energy of each rotor is converted as potential energy in a hydraulic fluid media and compounded as net potential energy. FIG. 2 shows an outline of the fluid conduits.

In an embodiment, the incoming low pressure fluid conduit 111, enters the inlet port 110a of the downwind rotor pump 104. Its outlet 110b at higher pressure is fed into the inlet port 110c of the upwind rotor pump 103. Thus, the pair of pump units is connected in series, so as to compound the potential energies of each pump unit, which is equivalent of compounding the power (kinetic energy) generated by two rotors and exits at the output port 110d. The primary objective of these pumps is to convert the kinetic energies of said rotors, as the net potential energy. The net potential energy fluid line 113 is next connected to the fluid accumulator (reservoir) 107, comprising certain volume of gas 108 at high pressure and a certain volume of liquid medium 109. Said accumulator can serve as a load balancer in varying wind state. Furthermore, said accumulator along with said hydraulic motor and said alternator can be housed in a cabin 141, below the ground level in the case of a land based unit or below the water surface (cabin deck) in the case of an offshore installation using floating platforms.

In an embodiment, the contra rotor wind turbine tower top canopy assembly 122 containing said pump unit assembly, is rotatably mounted on a swivel bearing unit 123 fastened to an up-right tower 121, while the digitally controlled hydraulic motor 106 and the electrical power generating unit 105 can be installed on the ground near the tower base. Thus, the cost of installation and maintenance can be significantly reduced. Furthermore, the rotors can now start easily since the light weight high speed alternator inertia load is not directly connected to the rotors, but indirectly through digitally controllable pump units 103, 104. For easy start, the inlet valve 110a and the outlet valve 110d of the hydraulic fluid lines can digitally be activated to achieve required torque to match the rotor generated aerodynamic torque at any wind speed, within the range of its operational limits.

In an embodiment, the net potential energy stored in the fluidic reservoir 107, is next used by a high speed hydraulic motor 106 to drive the alternator 105, which generates the dispatchable quality electric power 131. To maintain voltage and frequency compatibility with the alternator output 131 and the grid line 132, the pump unit inlet and outlet valves 116 and 117 can be digitally controlled to maintain the motor speed and torque, such that there would be no need for electronic power converter and transformer units. This method of compounding of the kinetic energies can be applied to a cluster of rotors in a wind farm, wherein multiple pairs of contra rotors are interconnected in series to compound the potential energies and store the net energy in a reservoir.

Figure 3:
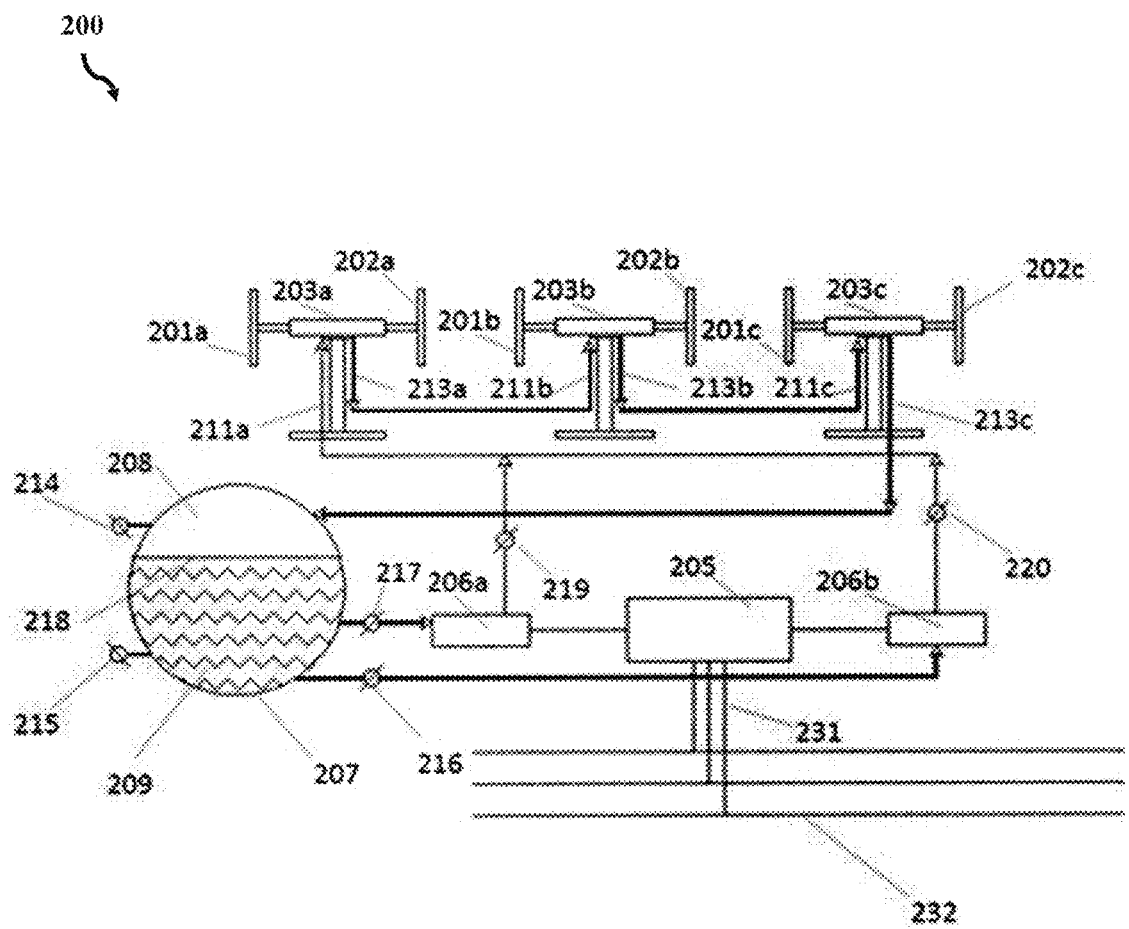
FIG. 3 illustrates a method of compounding the potential energies of plurality of radial bladed contra rotors installed in a wind farm. This approach leads to storage of the net potential energy in a fluid reservoir (accumulator) and requiring a single alternator to generate electric power from the stored fluidic potential energy source, according to an embodiment therein.
Figure 4:
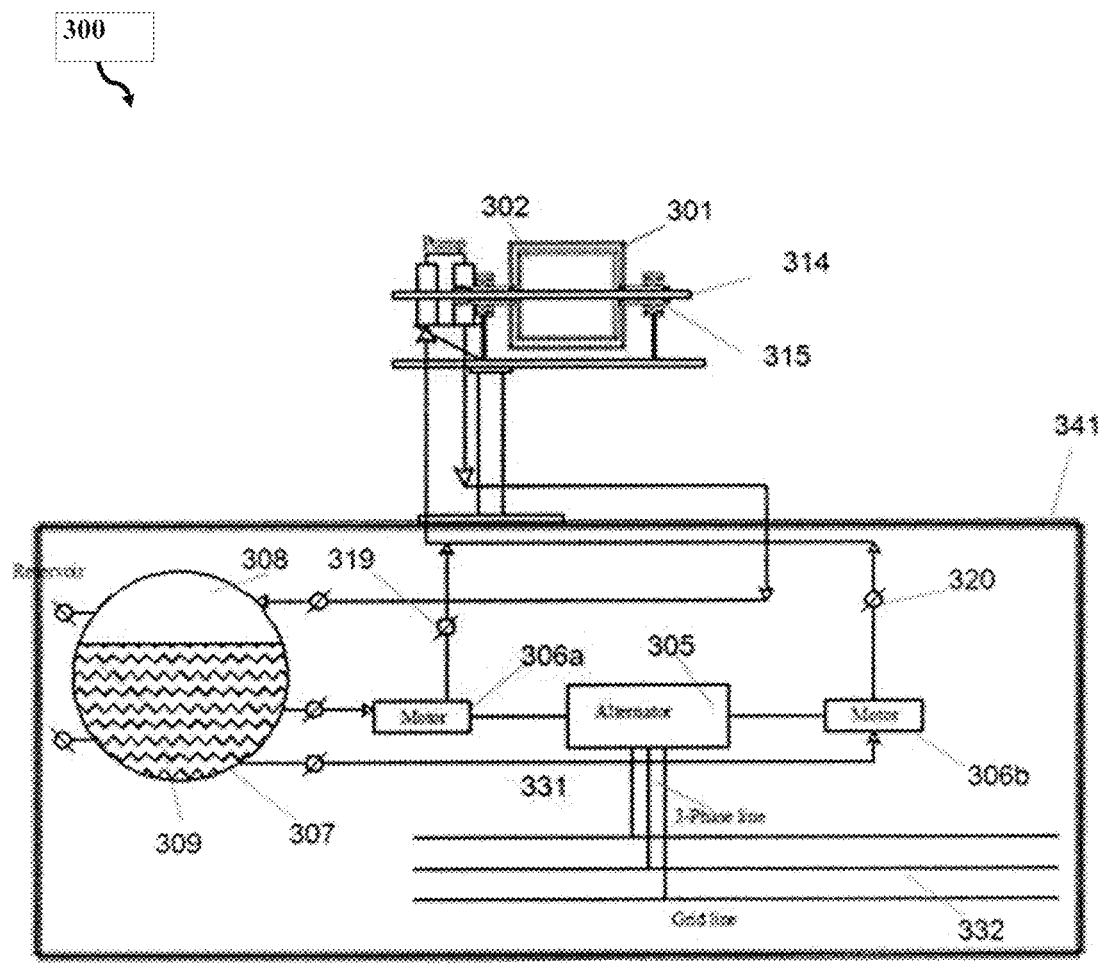
FIG. 4 illustrates a sectional view of an exemplary embodiment of the present innovation of a typical utility scale contra rotor wind turbine comprising of two helical bladed axial flow rotors set to spin in opposite direction to each other. Each rotor shaft is coupled to drive a digitally controlled positive displacement pump unit, such that the kinetic energy of the rotors is transformed into fluidic potential energy, according to an embodiment herein.

FIG. 3 illustrates a method of interconnecting multiple pairs of radial bladed contra rotors 200, according to an embodiment. For sake of convenience, we assume three towers having subscripts a, b, and c. The low pressure fluid line 211a enters the inlet of the downwind rotor side pump unit of tower top assembly 203a and exits at the upwind rotor side pump of said tower as the compounded potential energy 213a. Likewise, the net compounded potential fluid line exists as 213c and enters the compressed air chamber 208 of the reservoir 207. Thus, the total sum of all kinetic energies of the air mass swept by the plurality of said contra rotors is stored as the net potential energy of the fluid media contained in the reservoir 207. The electrical power generating alternator 205 can be driven by two hydraulic motors 206a and 206b, which can be set to spin either in the same direction or in the contra rotor concept. Said hydraulic motors are fed by the same high potential fluid media 209 contained in the reservoir 207. Once again, to maintain voltage and frequency compatibility between alternator output 231 and the grid line 232, said motor inlet valves 216, 217 and outlet valves 219, 220 are digitally controlled The art of integrating the contra rotor technology and the hydraulic power transmission device can equally be applied to either the vertical axis wind turbine, or the horizontal axis wind turbine. FIG. 4 outlines the concept for the case of a single tower and FIG. 5 for multiple towers, comprising plurality of light weight helical blades.

Figure 4A:
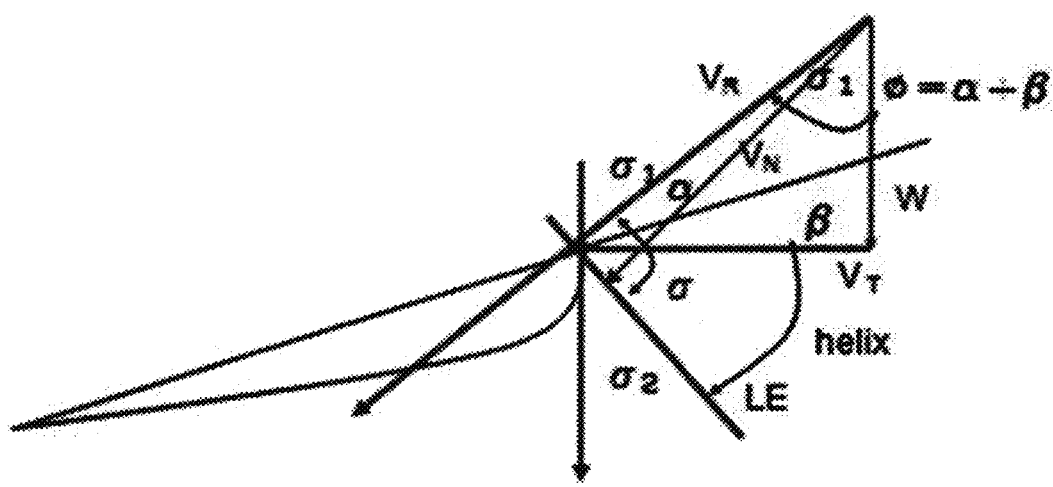
FIG. 4a illustrates the airfoil chord setting, a with respect to the resultant velocity vector VR and also the velocity vector VN normal to the helically contoured blade leading edge, according to an embodiment therein.

Case B: Axial Flow Helical Bladed Contra Rotor Wind Turbine:

According to an embodiment depicted in FIG. 4, the horizontal axis contra rotor wind turbine system 300 is provided, wherein the system comprising a pair of aerodynamic torque producing helical bladed rotors such as an outer rotor 301 and an inner rotor 302, wherein each rotor having plurality of helical blades, uniformly spaced around the cylindrical surface of each rotor. FIG. 4a shows the aerofoil setting of a helical blade with respect to resultant wind speed vector VR, at an angle of incidence α. Generally at a design rotor speed, the blade leading edge is set normal to the resultant velocity vector VR forming a helix angle. However, at varying rotor speeds, the wind velocity normal to the leading edge is given by VN.

Figure 4B:
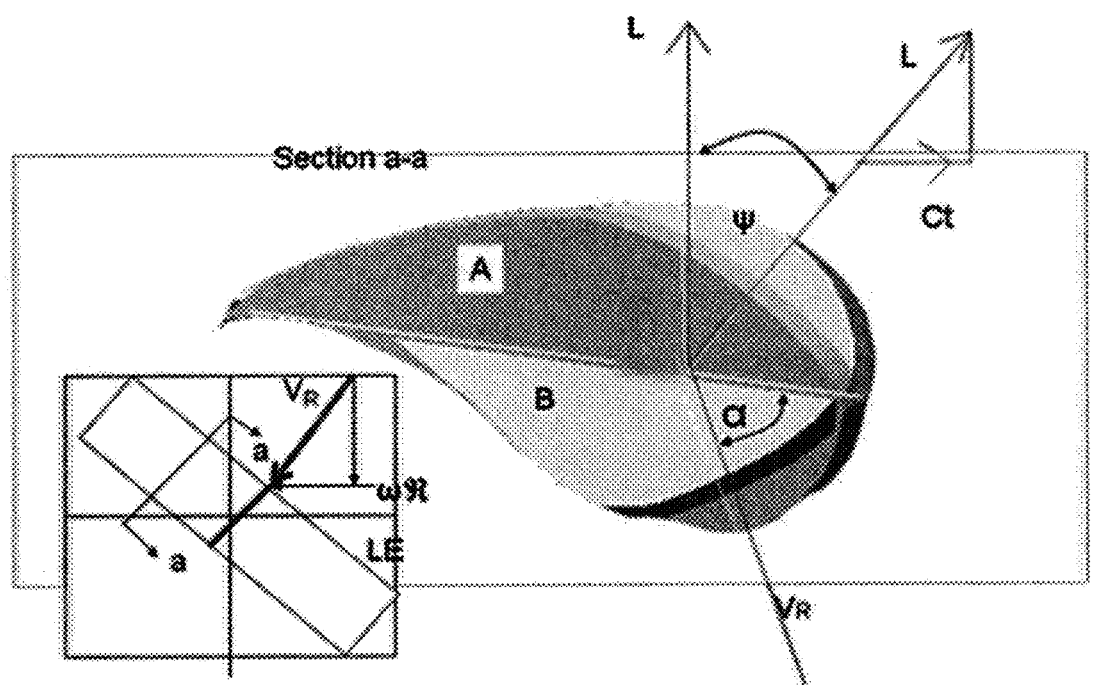
FIG. 4b illustrates the airfoil chord setting α with respect to the resultant velocity vector VR and also the airfoil section tilt angle ψ with respect to the normal to the cylindrical surface swept by the tangent velocity vector VT=ω·R, according to an embodiment therein.

Furthermore, FIG. 4b illustrates the blade configuration, which is required to produce efficient torque load. For this reason, the airfoil is tilted at angle ψ with respect to the tangent velocity vector, $Vt=\omega \cdot R$, wherein ω is the angular velocity of the rotor and R is the radius of said rotor.

In an embodiment, said outer rotor is rotatably coupled to the outer rotor shaft 315 (FIG. 4) and its plurality of blades 301 are set to spin the rotor in a first direction. Whereas, said inner rotor is rotatably coupled to the inner rotor shaft 314 and its plurality of blades are set to spin the rotor in a second direction, opposite to the first direction. Furthermore, each rotor shaft is coupled to low speed digital displacement hydraulic pump units 303, 304, (FIG. 4c) such that the kinetic energy of each rotor is transformed compoundedly into the net potential energy.

Figure 4C:
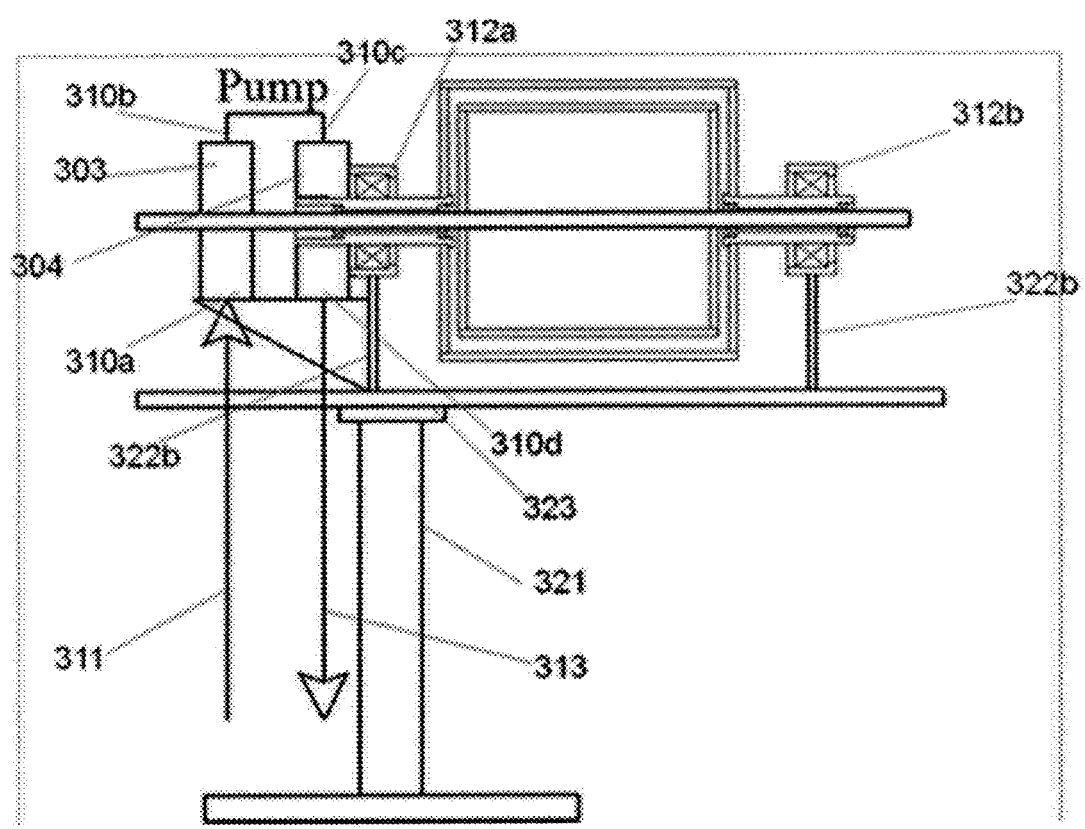
FIG. 4c illustrates the pump assemblies connected to the inner and outer helical bladed rotors of the axial flow turbine, according to an embodiment therein.

In an embodiment, said outer rotor shaft 315 and said inner rotor shaft 314 are supported on an assembly (FIG. 4c) of coaxial bearing units 312a, 312b, which are in turn supported on two upright columns 322a and 322b. The entire helical bladed contra rotor assembly is mounted on the upright tower unit 321 by means of an assembly of yaw bearing 323. Thus the rotor assembly can self align into the wind direction without the need of any yaw controlling device. The pump units are connected in series such that the kinetic energy of each rotor is converted as potential energy in a hydraulic fluid media and compounded as net potential energy. FIG. 4 and FIG. 4c show an outline of the fluid conduits.

The incoming low pressure fluid conduit 311 enters the inlet port 310a of the inner rotor pump 303. Its outlet 310b at higher pressure is fed into the inlet port 310c of the outer rotor pump 304. Thus, the pair of pump units is connected in series, so as to compound the potential energies of each pump, which is equivalent of compounding the power (kinetic energy) generated by two rotors. The primary objective of these pumps is to convert the kinetic energies of the rotors or the air mass swept by the rotors, as the net potential energy. The net potential energy, exiting at the outlet port 310d is conveyed via the fluid conduit 313 and is connected to the fluid potential energy accumulator 307, comprising of certain volume of gas chamber 308 at high pressure and certain volume of liquid 309.

FIG. 4 further describes the housing of the high potential energy filled fluid accumulator, the high speed hydraulic motor and an electrical alternator in a cabin 341 of a floating platform. The geometric design of said cabin will be such as to maintain stability of the floating platform at all wind conditions.

Figure 5:
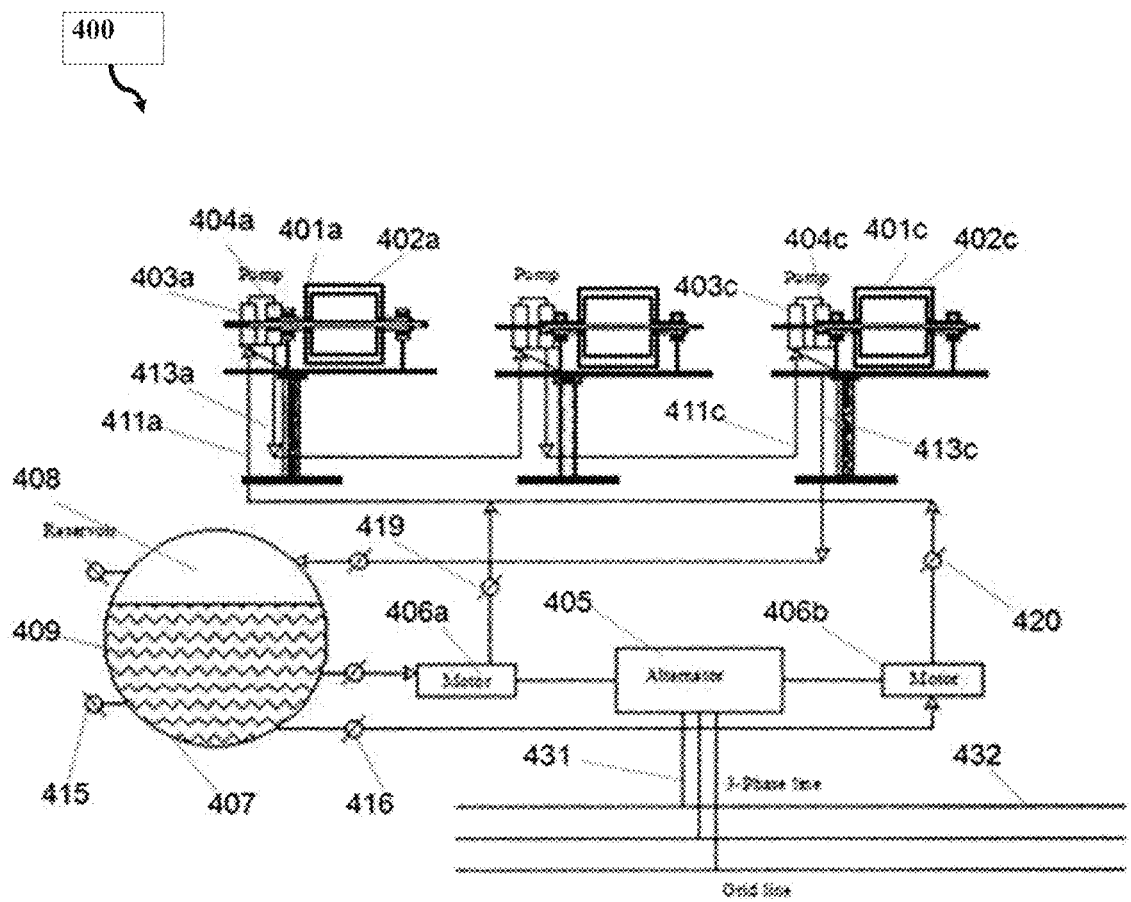
FIG. 5 illustrates a method of compounding the potential energies of plurality of helically bladed contra rotors installed in a wind farm. This approach leads to storage of the net potential energy in a reservoir and requiring a single alternator to generate electric power from the stored fluidic potential energy source, according to an embodiment therein.

FIG. 5 illustrates a method of interconnecting multiple pairs of helical bladed contra rotors 400. For sake of convenience, we assume three towers having subscripts a, b, and c. The low pressure fluid conduit 411a enters the inlet port of the inner rotor pump unit 403a and exits at the outer rotor pump unit of said tower as the compounded potential energy conduit 413a. Likewise, the net compounded potential fluid conduit exists as 413c and enters the compressed air chamber 408 of the reservoir 407. Thus, the total sum of all kinetic energies of the air mass swept by the plurality of said rotors is stored as the net potential energy of the fluid media contained in the reservoir 407. The electrical power generating alternator 405 is driven by two hydraulic motors 406a and 406b, which are set to spin either in the contra rotor concept or in parallel. Said motors are fed by the same high potential energy fluid media 409 contained in the reservoir 407. Once again, to maintain voltage and frequency compatibility between alternator output 431 and the grid line 432, said motor inlet 416, 417 and outlet valves 419, 420 are digitally controlled.

Figure 6:
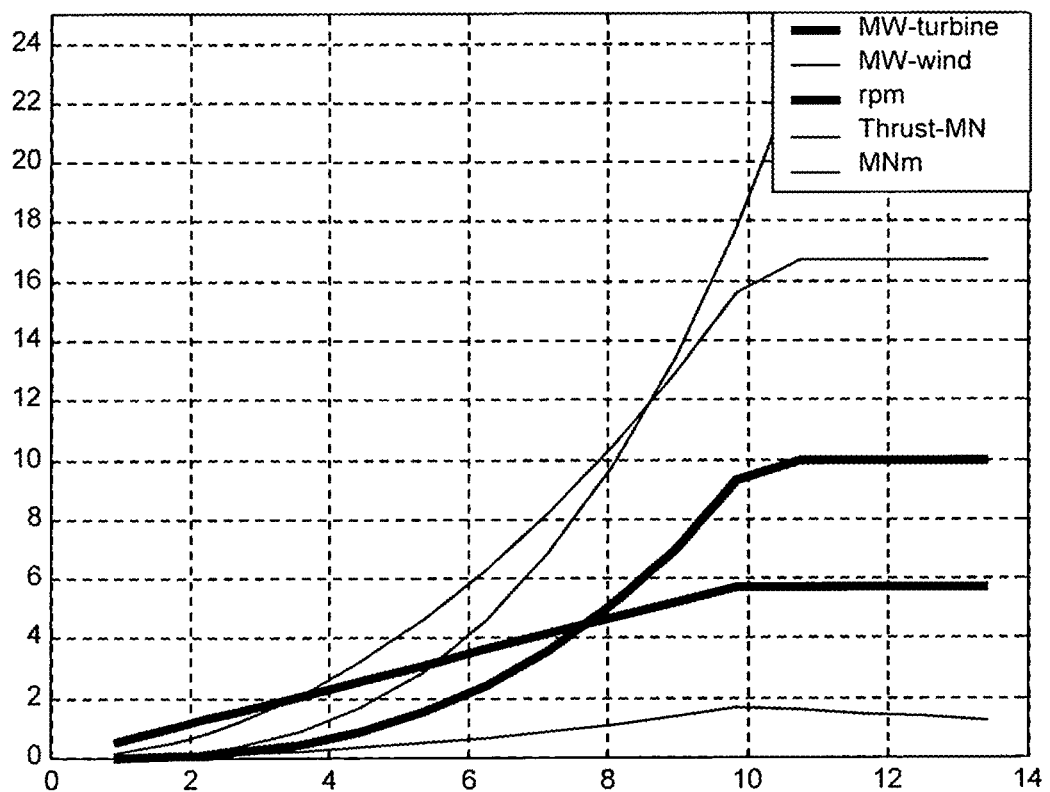
FIG. 6 illustrates the typical performance characteristics of a conventional radial bladed rotor, according to an embodiment therein.
Figure 7:
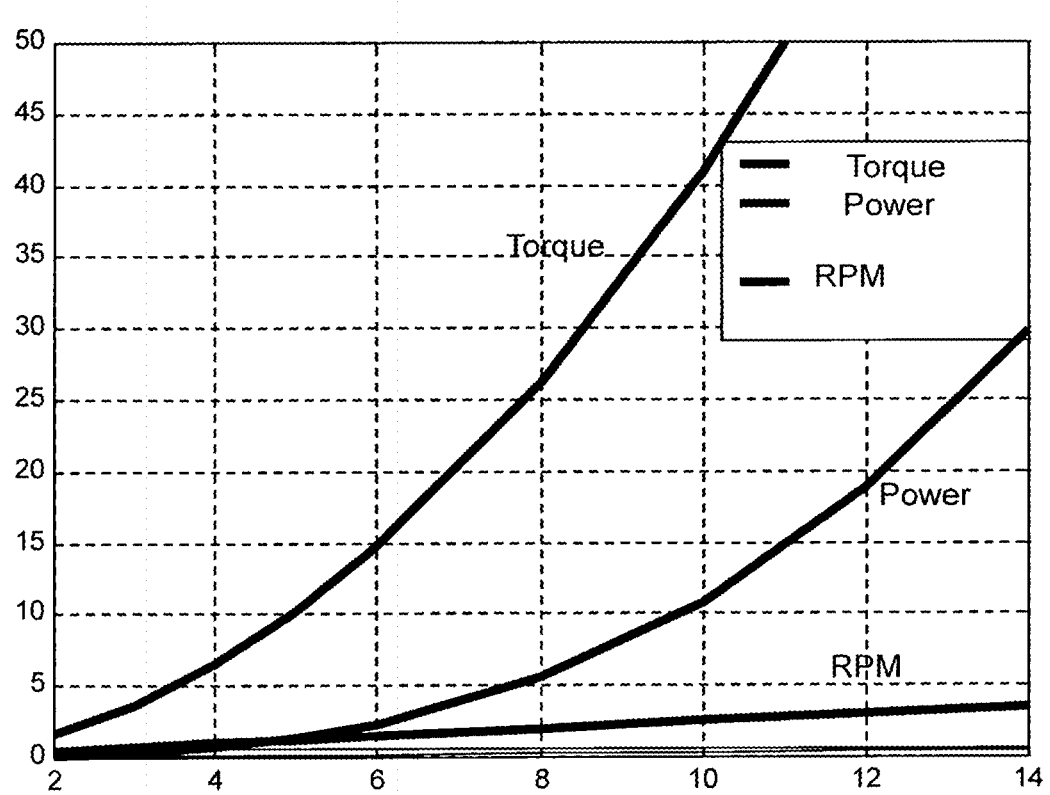
FIG. 7 illustrates the typical performance characteristics of a helical bladed rotor of the present innovation, specially intended for offshore wind farms due to its geometrical simplicity and light weight rotors requiring inexpensive installation and maintenance cost and also due to its superior aerodynamic performance, according to an embodiment therein.

To compare the merits of above said two types of rotors, analytical calculations were conducted for each rotor. FIG. 6 presents the power performance and the geometrical characteristics of a conventional radial bladed rotor, while FIG. 7 presents that of a helical bladed axial flow rotor. The specifications of each rotor are as follows:

|  | Conventional Radial Bladed HAWT | Axial Flow Helical Bladed HAWT |
| --- | --- | --- |
| Rated Wind speed | 10 m/s | 10 m/s |
| Tip Speed Ratio | 6 | 2.5 |
| Rotor Speed | 5.7 rpm | 2.5 rpm |
| Rated Power | 10 MW | 10 MW |
| Blade Length | 98 m | 20 m |
| Number Blades | 3 | 79 |
| Blade Tip Chord | 4.8 m | 1 m |
| Each Blade Weight | 55 tons | 0.38 ton |
| Rotor Diameter | 196 m | 188 m |
| Hub Height | 130 m | 120 m |
| Blade Helix Angle |  | 68 deg |
| Rotor Weight | 165 tons | 30 tons |

Although both rotor configurations extract the same amount of power from the same swept wind stream flow, there are two major differences, namely, the blade geometry and the rotor speed. In the case of the conventional radial bladed configuration, each blade length is 98 meter long and each blade weighs well over 55 tons. This requires special crane support to transport, install and maintain the turbine. Whereas, the helical configured rotor comprises of plurality of smaller blades, which are less than 20 m in length and weigh less than 0.4 ton each. Smaller light weight blades can be transported and installed inexpensively. Another interesting feature of the axial flow rotor is its rotor speed, which is around 2.8 rpm versus 8 rpm for the radial bladed rotor, meaning lightly stressed dynamic environment. Furthermore, the noise level will be far less than that of a conventional radial bladed rotor, since the sound level varies as the fifth power of the rotor speed. Hence, the helical bladed axial flow rotor configuration becomes a better choice for the offshore wind farms.

Since the helical blades are set at constant radial position, the remaining stream flow domain can be used to place another concentric rotor, which can be set to spin either in the same direction (mounted on the same shaft 314) as the outer rotor or in the opposite direction (mounted on a coaxial shaft 315).

In the case of conventional radial bladed rotors, the vortices shed at the blade tip are kinetically energized due to the centrifugal force exerted on the fluid mass distributed along the blade length. For this reason, the tower spacing is used as 6 to 8 times the rotor diameter. Whereas, in the case of the axial flow helical bladed rotors, the shed vortex strength is much weaker for two reasons: (1) The helical bladed rotors, for the same power rating, need to spin at lower rotational speeds than that of the conventional radial bladed rotor, (2) The shed vortices are distributed along the length of the blade, hence they are weaker in strength. Hence, the tower spacing can be closer than that for the radial bladed rotors.

The Benefits of the Contra Rotor Turbine Technology Using a Hydraulic Power Transmission Device are:

The aerodynamic rotors need not drive the massively geared alternator unit, which may weigh in excess of 200 to 400 tons. Instead, the rotors can start turning plurality of digitally controlled pump units in low wind speeds converting the kinetic energy of each rotor into compounded potential energy and stored in a hydraulic fluid media, which can be used to drive a high speed hydraulic motor coupled to a conventional light weight alternator.

With the advent of the digital displacement hydraulic power transmission units, the contra rotor technology has solved the massive inertial problem and will lead to better performance.

The tower top weight can be reduced, since only the digital displacement pump units need be on the tower top, while the high speed hydraulic motor and the light weight alternator could be placed on the ground level for the convenience of installation and reduced maintenance cost.

There is no need for power conversion units and slip rings which carry high amps, since the motor speed can be controlled to run a conventional alternator with fixed wound armature unit.

The flow behind each CRWT unit is seen to be nearly vortex free. Hence, tower spacing could be closer, leading to the placement of more towers in a given site and more of annual energy production.

The noise problem associated with higher power rated wind turbines is now reduced, because of the contra rotation of two rotors, wherein the vortex energy imparted by the upwind rotor is utilized by the downwind rotor to generate mechanical power.

In a wind farm, whether land based or offshore based, plurality of contra rotor units can be compounded to store the net potential energy in a single fluid reservoir and operate a single alternator, so as to enhance efficiency and minimize cost of maintenance.

For the same power rating, the axial flow helical bladed rotor runs at almost one third the speed as that of the conventional radial bladed rotor and hence it is much quieter than the conventional radial bladed rotor.

In the case of the axial flow helical bladed rotors, the shed vortex strength is much weaker for two reasons:

(1) The helical bladed rotors, for the same power rating, need to spin at lower rotational speed versus that of the conventional radial bladed rotor, (2) The shed vortices are distributed along the length of the blade, hence they are weaker in strength versus that for said conventional rotors.

Hence, the tower spacing can be closer than that for said radial bladed rotors.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An electrical power generating contra rotor wind turbine system comprising:

a canopy of frame work rotatably mounted on a tower top;

a pair of coaxial contra rotating rotors, having plurality of radially extended blades, and set to spin in opposite direction to each other;

an electrical power generating alternator;

a system of digitally controlled hydraulic pump assembly mounted inside of said tower top canopy and suitably coupled to said rotors so as to convert the kinetic energy of said rotors into fluidic potential energy in a compounded manner and stored in a fluid accumulator;

an underground mounted hydraulic power transmission system of hydraulic motor assembly suitably coupled to drive said alternator to generate electrical power;

said hydraulic power transmission device having the ability to be programmed to play the role of a speed controller as well as an emergency braking system; and said alternator being configured to be driven by either a single high speed hydraulic motor or plurality of pairs of hydraulic motors, either in the same direction or in contra rotation, such that the magnetic flux speed increases due to the contra rotation of the magnetic field and wound armature of said electrical generator, leading to substantially increased annual energy production.

2. The system of claim 1 further comprises a system of bearing assembly which ensures unidirectional motion of each rotor and also ensures load carrying bearing assembly for satisfactory performance of said rotors coupled to said alternator.

3. The system of claim 1 further comprises a system of hydraulic pump assembly placed on said tower top and converts the kinetic energy of the contra rotors in a compounded manner into the potential energy stored in a fluid accumulator.

4. The system of claim 3 further comprises a system of digitally controllable high speed hydraulic motor driven by the potential energy of said fluid media and coupled to an electrical power generating alternator assembly housed in an underground cabin near said tower base.

5. The system of claim 4, wherein the magnetic field unit is driven by one motor, while a wound armature unit is driven by another motor in opposite direction to each other, leading to increased electrical efficiency and reduced alternator weight and reduced cost per unit of power generated.

6. The system of claim 1 can be applied to plurality of contra rotors so as to achieve net compounded potential energy that can be stored in a fluid accumulator and used to run a single alternator, resulting in reduced cost of energy and reduced maintenance.

7. The system of claim 1, wherein said contra rotor concept, minimizes the vortex strength in the downwind flow resulting in reduced noise and turbulence, permitting closer spacing of towers leading to enhancement of annual energy in a given wind farm site.

8. The system of claim 7, wherein said, vortex strength in the case of axial flow helical bladed rotor is weak, since the vortex shedding is distributed along the blade length, unlike in the case of conventional radial bladed rotor, wherein the concentrated vortex spills at the blade tip.

9. The system of claim 1, the aerodynamic rotors could start turning plurality of pump units in low wind speeds converting the kinetic energy of each rotor into potential energy in the compounded manner and stored in a hydraulic fluid accumulator, which can be used to drive a high speed hydraulic motor coupled to a conventional light weight alternator to generate grid quality electrical power, requiring no other power conversion unit.

10. The system of claim 1, the tower top weight can be reduced, since only the digital displacement pump units need be installed on the tower top, while the high speed hydraulic motor and the light weight alternator could be placed on the ground level for the convenience of installation and reduced maintenance cost.

11. The system of claim 1, requires no power conversion device, since the motor speed can be controlled to run a conventional alternator with fixed wound armature unit to meet the grid quality power output.

* * * * *